(12) United States Patent
Shell et al.

(10) Patent No.: US 7,062,274 B2
(45) Date of Patent: Jun. 13, 2006

(54) INCREASING THE LEVEL OF AUTOMATION WHEN ESTABLISHING AND MANAGING NETWORK CONNECTIONS

(75) Inventors: Scott R. Shell, Redmond, WA (US); Andrew R. Raffman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 10/061,537

(22) Filed: Feb. 1, 2002

(65) Prior Publication Data

US 2004/0224668 A1 Nov. 11, 2004

Related U.S. Application Data

(60) Provisional application No. 60/299,826, filed on Jun. 21, 2001.

(51) Int. Cl.
*H04M 1/00* (2006.01)

(52) U.S. Cl. ...................... 455/445; 455/572
(58) Field of Classification Search ............... 455/445, 455/452.2
See application file for complete search history.

(56) References Cited

U.S. PATENT DOCUMENTS

| 6,385,201 B1* | 5/2002 | Iwata ........................ 370/400 |
| 6,854,009 B1* | 2/2005 | Hughes ...................... 709/220 |
| 2002/0049800 A1* | 4/2002 | Kobayashi et al. ............ 709/1 |
| 2003/0040316 A1* | 2/2003 | Stanforth et al. ........... 455/445 |

OTHER PUBLICATIONS

QOS-Policy Based Routing in Public Heterogeneous Broadband Networks, M. Chatzaki and S. Sartzetakis, Interoperable Communications Networks, Publ. by Baltzer, Netherlands, vol. 1, No. 2-4, pp. 476-487, 1998.
Network Dispatcher: A Connection Router for Scalable Internet Services, G.D.H. Hunt et al., Computer Networks and ISDN Systems, Publ. by Elsevier, Netherlands, vol. 30, No. 1-7, Apr. 1998, pp. 347-357.
The Use of VSAT to Extend the Company LAN to All Its Retail Sites, M. Beeler et al., IEE Colloquium on 'Networking Aspects of Small Terminal Satellite Systems', Publ. by IEE, London, UK, Digest No. 1994/221, 1994, pp. 3/1-3/6.

* cited by examiner

*Primary Examiner*—Creighton Smith
(74) *Attorney, Agent, or Firm*—Workman Nydegger

(57) ABSTRACT

Increasing the level of automation when establishing and managing network connections. A connection manager operates between system level APIs and application programs, providing a level of abstraction. When a user wishes to access a remote resource included in destination network, the user simply identifies the remote resource and the connection manager performs the underlying operations. The connection manager relieves users from having to know detailed information about the remote resource and the destination network. When the connection manager receives a request to access a remote resource, connection manager may utilize extensible decision logic to identify a most appropriate connection method for connecting to a destination network. Such decision logic may include comparing prioritized connection requests to local resources available in a local computing device, as well as, comparing connection parameters associated with connection methods. The connection manager may utilize connection service provider modules to establish identified connection methods.

16 Claims, 6 Drawing Sheets

INCREASING THE LEVEL OF AUTOMATION WHEN ESTABLISHING AND MANAGING NETWORK CONNECTIONS

CROSS-REFERENCE TO RELATED APPLICATIONS

The present application claims priority from U.S. provisional patent application Ser. No. 60/299,826, filed Jun. 21, 2001 and entitled "Connection Manager," which provisional application is incorporated herein by reference in its entirety.

BACKGROUND OF THE INVENTION

1. The Field of the Invention

The present invention relates to increasing the level of automation when establishing and managing network connections. More specifically, the present invention relates to systems, methods, and computer program products for abstracting connection information from a user so as to limit required user interaction when creating network connections.

2. Background and Relevant Art

Computer devices operating in a networked environment often have a variety of connection methods that may be used to connect to a variety of resources located on different networks. For instance, a computer may include a modem for establishing dial-up connections and a network interface card ("NIC") for establishing Local Area Network ("LAN") connections. For a computing device to establish a connection to a particular resource, the user of the computing device often needs a relatively high level of information about how to connect to the resource. The extent of information needed to connect to a resource may increase for portable computing devices that are moved between a variety of different physical locations.

To connect a computing device to a resource, a user of the computing device may often be required to know a network where the resource is located and a method for connecting to the network. For example, when a portable computing device requests access to the Internet, the user of the device may need to know that when, at home, the computing device uses a dial-up connection and, when at the office, the computing device uses a corporate LAN connection. When in the office, the corporate LAN connection may be preferred over the dial-up connection that may incur long distance charges or prevent others from using an associated telephone line. For the user of a computing device, it may be quite burdensome to reconfigure operations every time the portable computing device is moved between the home and the office or vice versa.

Additionally, conditions associated with a network may make establishment of a connection using a particular connection method undesirable at certain times. For example, if a network is experiencing heavy usage, bandwidth may be reduced. In other cases, a network may be experiencing a high degree of latency. A user may not be aware of network conditions and may unknowingly use a less desirable connection method to access a resource. It may also be that users are not aware of the costs associated with different types of connections and simply use the same connection because they are familiar with the connection. For example, when in his or her office, a user may establish a dial-up connection to connect to a corporate LAN, even if it is more expensive or will result in reduced data throughput, simply because he or she lacks the desire or technical expertise to establish a hardwired corporate LAN connection.

There may also be cases where multiple connection requests are made to a single connection method. This may occur in a device that receives multiple connection requests to create a dial-up connection, yet includes a single modem. For example, a request to dial-up to a corporate remote access services ("RAS") server to synchronize corporate electronic mail may be received while a computing device is already connected to a user's Internet Service Provider ("ISP") browsing stock quotes. Conventionally, the computing device would stay connected to the ISP because it does not have a way to determine which connection is more important. Likewise, if a user attempts to use a telephone line for a voice call, a user may need to cause a current data connection to disconnect before a voice call may be established. Similarly, there may be situations where, even though the hardware has the ability to connect to two different networks at the same time, it is impermissible to do so for security reasons. In such cases, a connection to a first network must be dropped before a connection to a second network may be established.

Other problems associated with connection methods also exist at the programming level. Most connection methods utilize different Application Program Interfaces ("APIs") when establishing a connection. Even connection methods that use the same APIs often utilize the APIs in a different manner when establishing a connection. For example, a corporate LAN connection using Ethernet may utilize a completely different set of APIs than a dial-up connection that connects to a RAS server. Likewise, a dial-up connection to a RAS server that will establish a Virtual Private Network ("VPN") connection may send different parameters to APIs than a standard connection to a RAS server. Requiring programmers to know the nuances of different connection methods may be time consuming and reduce their efficiency.

All of the above problems may be compounded in mobile devices, such as mobile phones or Personal Digital Assistants ("PDAs"), that connect to a relatively higher number of networks and use a variety of connection methods. For example, a PDA may connect to a home network using a first network card, a corporate network using a second network card, and connect via a wireless modem from other locations. As a result, users of the PDA may check their corporate electronic mail account using a variety of different connection methods. Each connection method may be associated with different configuration parameters, including phone numbers, network addresses, or authentication data, for proper operation of the connection. Thus, a user may need to have comprehensive knowledge of a number of connection methods to correctly establish a connection to check electronic mail.

Therefore, what is desired are systems, methods and computer program products for automating the establishment and management of various kinds of network connections in a manner that reduces the amount of information a user must know to establish a connection.

BRIEF SUMMARY OF THE INVENTION

The principles of the present invention provide for increasing the level of automation when establishing and managing various kinds of network connections. A connection manager abstracts connection methods in order to reduce the amount of data a user (or application) must know to request a connection to a resource. A user need only request the resource he or she wishes to connect to and the connection manager decides which connection methods to utilize. A user does not need to identify the underlying properties of the network where the resource is located or a connection method for getting to that network.

This is particularly useful in mobile devices for which available connection methods change frequently. For example, the level of user knowledge needed to connect to a resource may be greatly reduced in a mobile device that uses different wireless network adapters for connecting to home and corporate networks and that uses a dial-up connection for connecting from other locations. In addition, connection requests may be prioritized so that higher priority requests cause lower priority requests to release a connection method so it may be used by the higher priority request. For example, a voice call may be given higher w priority over data calls that share the same modem.

To establish a connection, a user may request access to a resource that is accessed by connecting to a destination network. This may be as simple as a user specifying the synchronization of an electronic mail account by activating a control in a user interface. However, this may be more complex, for example, when a user attempts a voice call on a telephone line that is currently being used for a data connection.

The connection manager may then consider available connection methods for connecting to a destination network associated with a request. Connection methods may differ based on the type of connection, for example, dial-up, hardwired network, or wireless network. The connection methods may also differ based on the destination network associated with a connection method, even if the accessed remote resource will be the same. For example, to access corporate electronic mail, a user may dial directly into a corporate network or may dial into a public Internet Service Provider ("ISP") and then connect to the corporate network through a Virtual Private Network ("VPN") connection. Additionally, connection methods may differ based on connection parameters associated with a connection method. For example, connecting to a corporate network and then accessing the Internet via a proxy server may be associated with different connection characteristics than connecting to a public ISP and creating a VPN connection to access corporate data.

In order to accommodate a connection request, the connection manager at least partially automatically identifies a most appropriate connection method from among available connection methods. To facilitate identification, the connection manager may consider, for example, the monetary cost of using a connection method, the bandwidth available to a connection method, the latency associated with a connection method, power consumption, current battery status, signal strength, physical location, past connection success, or other parameters.

The connection manager may also consider a priority associated with a request. Thus, even if a connection method is otherwise appropriate for a request, the connection manager may not utilize the connection method if the request is not associated with a particular priority. For example, assume that synchronizing corporate electronic mail has a higher priority than browsing stock quotes on the Internet. If a request to browse stock quotes is received during synchronization of electronic mail over a high speed Local Area Network ("LAN") connection, the connection manager may opt to connect to the Internet through a slower dial-up connection for browsing stock quotes. Alternately, connection manager may delay the request to browse the Internet until mail synchronization has completed, or take some other action to ensure that the lower priority request does not adversely impact the high priority request.

Additionally, the connection manager may utilize a fairly complex heuristic to attempt to prioritize among multiple competing connection requests while balancing priority with performance and fairness among requests. As an example, the connection manager may choose to preempt a higher priority request if by doing so it can honor a set of lower priority requests, or alternatively if the higher priority request has exceeded some time or bandwidth allotment, or for some other reason.

It may also be that an otherwise appropriate connection method for accessing a resource is currently not available, for example, where a removable network card is no longer included in a mobile device. The connection manager compensates for this, as well as other network errors, by identifying the most appropriate connection method at the time a request is received. The connection manager may periodically reevaluate connections and identify a different connection method as the most appropriate.

When a most appropriate connection method is identified, the connection manager causes a connection to be established to the destination network using the most appropriate connection method. This may include the connection manager causing the establishment of a dial-up connection, hardwired network connection, wireless network connection, or combinations thereof. This may also include the connection manager establishing a connection to a specific network location or associating particular characteristics with a connection such as a connection through a proxy server or the creation of a VPN connection.

When the connection manager makes decisions about the most appropriate connection method, a user is alleviated from having to know extensive details associated with different connection methods. This may result in the establishment of more efficient and less costly connections.

Additionally, the connection manager and its associated components may operate between higher-level applications that request connections and system level APIs that actually establish connections. Thus, the connection manager offers a level of abstraction between applications and system level APIs. Such abstraction may serve to reduce the programming complexity associated with creating connections that utilize different APIs or utilize the same APIs in different manners.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

Figure 1:
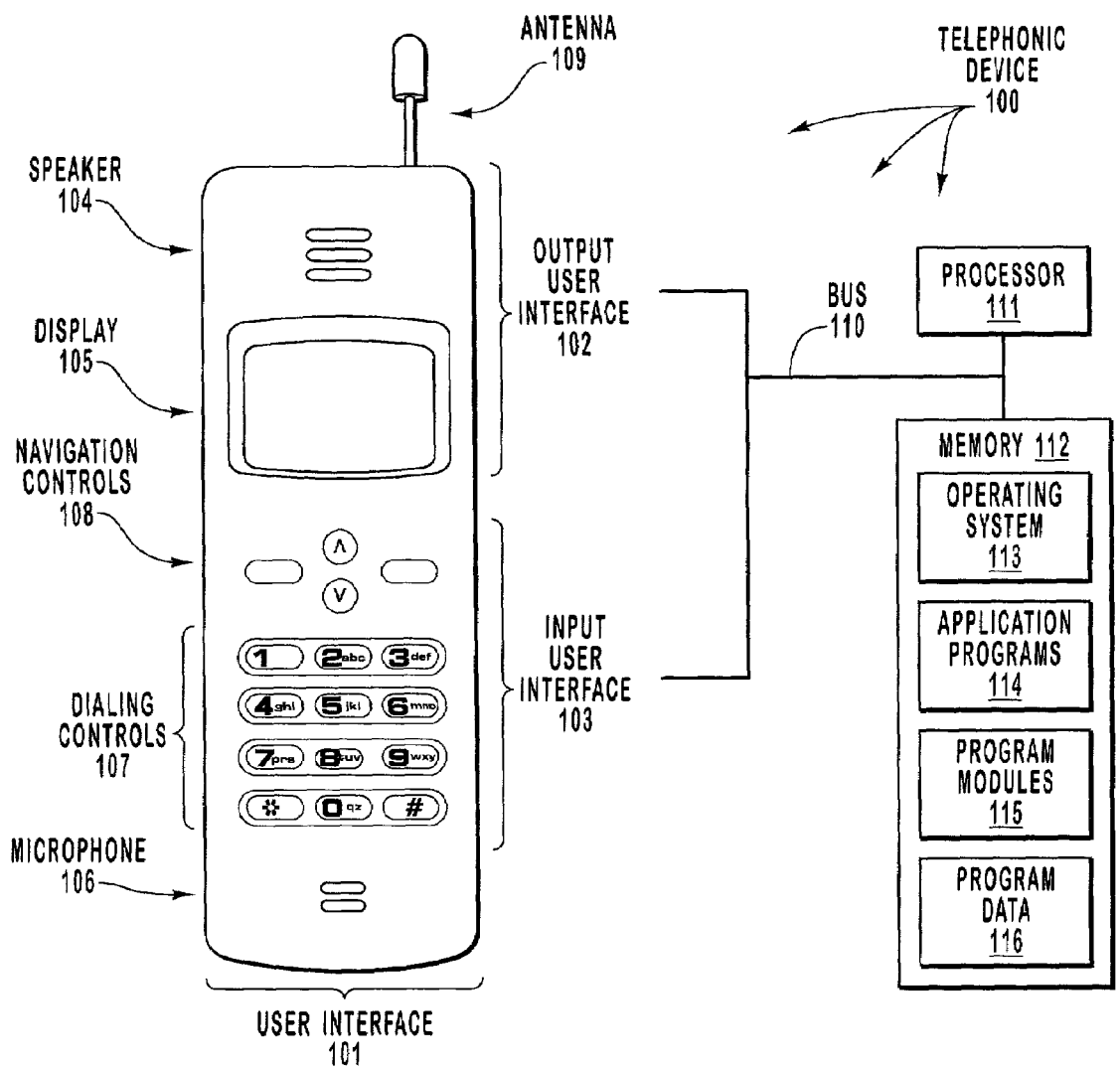
FIG. 1 illustrates an example of a mobile computing device that provides a suitable operating environment for the present invention.

The present invention extends to systems, methods, and computer program products for increasing the level of automation when establishing and managing various kinds of network connections. A connection manager abstracts connection methods from the user to simplify the amount of data a user must be familiar with in order to request a connection to a remote resource. The connection manager manages one or more connection service providers that may facilitate the creation of different types of network connections between a source network and a destination network. A connection planner may determine what connection method is most appropriate for establishing a connection at a particular time.

During operation, an application included in a computing device may request access to a remote resource located in a destination network. This request may be received by a connection planner, which analyzes a variety of factors to determine the most appropriate connection method to connect to the destination network. Such factors may include the local resources currently available on the computing device, the priority of the request, or connection parameters (such as latency, cost, and bandwidth) associated with a connection method. When the most appropriate connection method is known, a connection service provider associated with the connection manager may cause a system level Application Programmer Interface ("API") to create a connection from a local computing device to the destination network.

The embodiments of the present invention may comprise a special-purpose or general-purpose computing device including various computer hardware, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computing devices, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computing device in the form of a telephonic device 100. The telephonic device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for translating audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although user interface 101 has the appearance of a mobile telephone, the unseen features of user interface 101 may allow for complex and flexible general-purpose processing capabilities. For example, telephonic device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in telephonic device 100 is not important to the present invention. Telephonic device 100 may also be associated with other mass storage devices (not shown), typically associated with general-purpose computers.

Although a telephonic device is illustrated in FIG. 1, embodiments of the present invention may also be practiced with a personal computer. A personal computer may include any of the components discussed with respect to telephonic device 100. A personal computer may also be associated with an input user interface in the form of a keyboard and/or mouse and an output user interface in the form of a display device. A personal computer may be coupled to associated network systems via wireless technologies, hardwired technologies, or combinations thereof.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any device that is capable, with suitable modification if necessary, of implementing the principles of the present invention. The environment illustrated in FIG. 1 is illustrative only and by no means represents even a small portion of the wide variety of environments in which the principles of the present invention may be implemented.

In accordance with the present invention, modules such as connection managers, connection service providers, connection planners and configuration user interfaces, used to facilitate establishment and management of network connections, as well as associated program data, may be stored and accessed from any of the computer-readable media associated with telephonic device 100. For example, portions of program modules and associated program data may be included in operating system 113, application programs 114, program modules 115 and/or program data 116, for storage in memory 112. Such portions of program modules and associated program data may also be stored in any of the mass storage devices previously described. Execution of program modules associated with the establishment and management of network connections may be performed in a distributed environment as previously described. For example, a connection manager module included in a remote computing device may facilitate establishment of a network connection from a local processing device, such as telephonic device 100, to a destination network. Likewise, a connection manager module in a local processing device may facilitate establishment of a connection from a remote processing device to a destination network.

Figure 2:
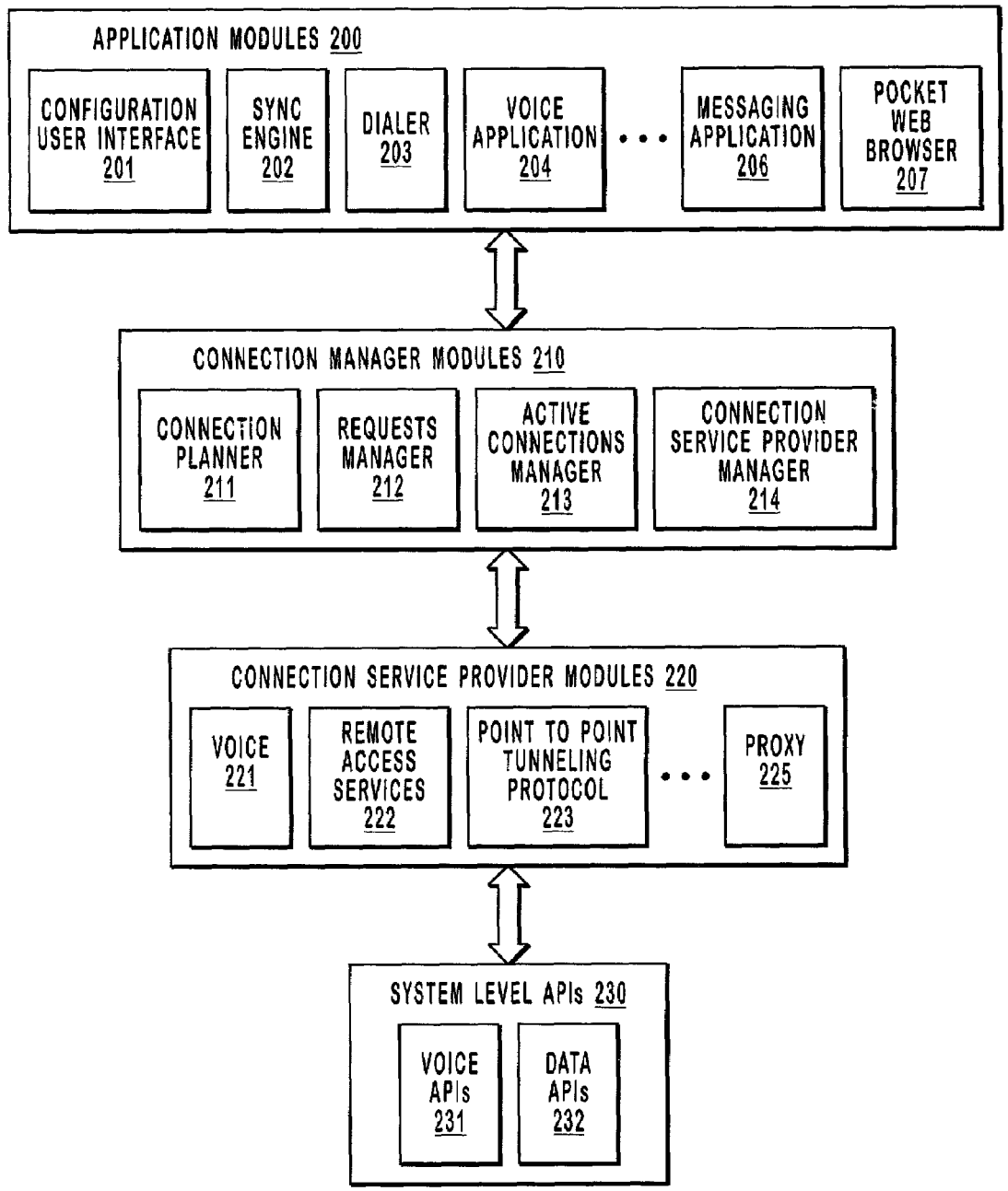
FIG. 2 illustrates an example of some of the functional components that may facilitate management of connection methods.

Shown in FIG. 2 are some of the functional components that may be used to facilitate establishment and management of network connections. As illustrated, connection manager modules 210 and connection service provider modules 220 operate between application modules 200 and system level APIs 230. This arrangement offers a level of abstraction between application modules that may request a connection, and the system level APIs that actually establish the connections.

Connection manager modules 210 and connection service provider modules 220 may be configured as APIs that receive standard data when being called by another module. Such modules may include computer-executable instructions that cause, directly or indirectly, the appropriate calls to be sent to system level APIs 230. Thus, the process of establishing connections is simplified for application modules 200.

Connection service provider modules 220 may operate in a plug-in fashion where appropriate modules are utilized based on the configuration of a computing device. Connection service provider modules 220 may be configured to establish different types of connections, some of which are illustrated in FIG. 2. However, other connection service provider modules that provide other types of connections may also be utilized. For example, connection service providers may be created for BLUETOOTH™ connections, secure sockets layer connections, hardwired Ethernet connections, or any other connection that may call system level APIs 230 so as to create a connection to a destination network. It should be understood that these are only examples of types of connections that may be created. It would be apparent to one skilled in the art, after having reviewed this description, that a wide variety of connection methods may be utilized, whether now existing or whether to be developed in the future.

APIs associated with connection manager modules 210 and connection service provider modules 220 may be integrated into protocol stacks. In these embodiments, APIs associated with connection manager modules 210 and connection service provider modules 220 may be called instead of APIs associated with conventional protocol stacks.

In some embodiments configuration user interface 201 may be used to configure connection methods. Configuration user interface 201 may be hidden from average users and accessible only technically qualified personnel. Thus, service technicians may be able to configure connection methods in a manner that is suitable to entities that have an interest in connection methods. For example, a wireless carrier may wish to configure certain connection methods that are more cost efficient and may want to force users on their network to use the certain connection methods.

Figure 3:
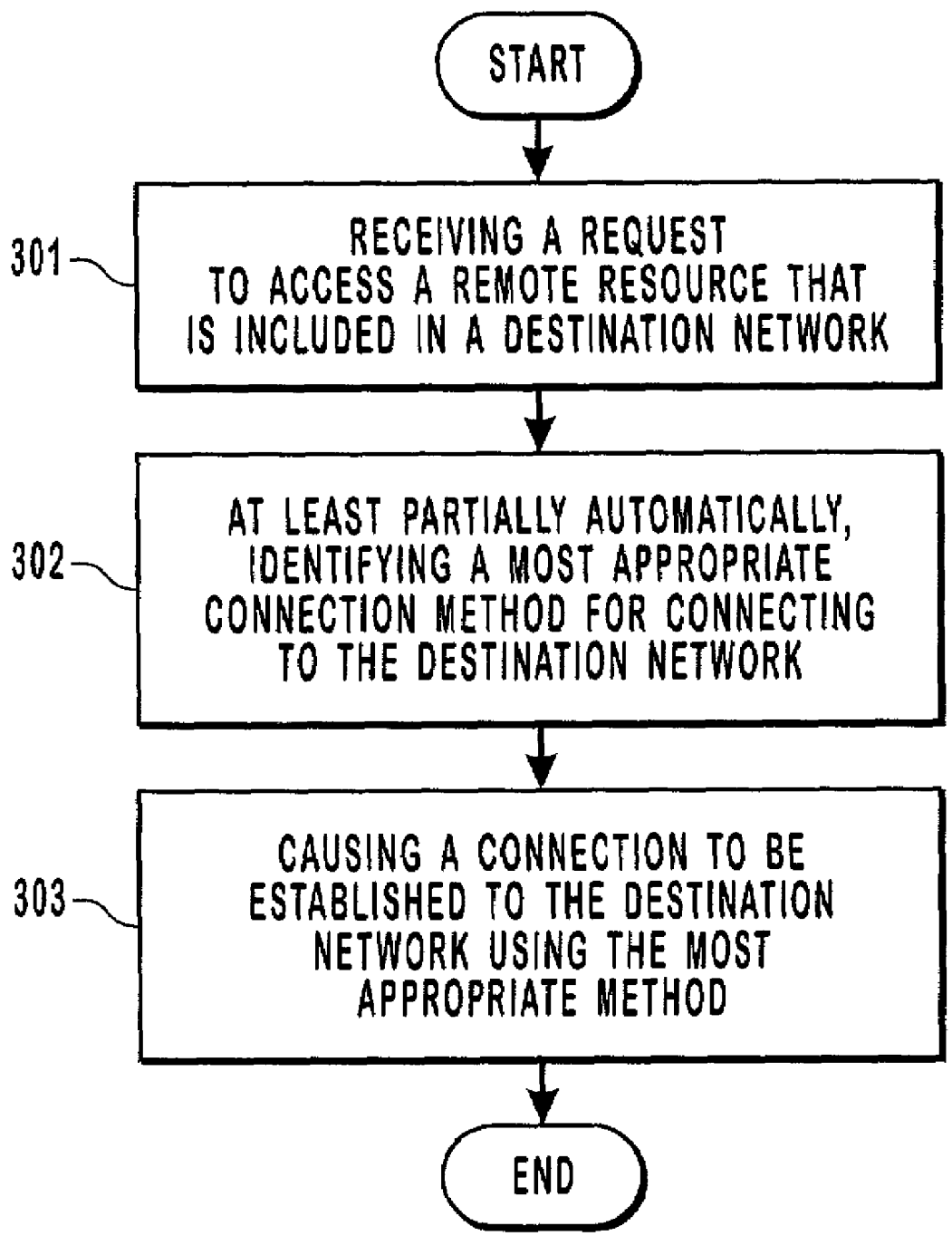
FIG. 3 is a flow diagram illustrating an example of a method for establishing a connection without necessarily requiring that a user specify the connection method.

Shown in FIG. 3 is a flow diagram illustrating a method of establishing a connection without necessarily requiring the user specify the connection method to use. The method in FIG. 3 will be discussed with reference to the functional components included in FIG. 2.

As illustrated in FIG. 3, a request to access a remote resource that is included in a destination network may be received (act 301). This may include connection manager modules 210 receiving a request from one of the application modules 200. For example, sync engine 202 may request that a remote electronic mail box be synchronized with a local computing device or pocket web browser 207 may request that a remote web page be loaded. Activating a control in a user interface, for example, a button, a drop down list or other element, may initiate such requests. Such a user interface may be, for example, user interface 101 of FIG. 1. Application modules 200 may include any module, in addition to those illustrated, that is capable of requesting access to a remote resource included in a destination network.

The most appropriate connection method for connecting to the destination network may be identified (act 302). This identification may be done automatically, without requiring any user intervention at all. Oftentimes, connection methods may inherently require a user to input authentication information, such as a user name and password, when establishing a connection to a secure Web site. In such cases, authentication information is sent via the most appropriate connection method after the most appropriate connection method has been identified. Accordingly, although connecting may not be entirely automatic, the identification is automatic and occurs without the user needing to know specific information about the connection itself.

In FIG. 2, one or more of connection manager modules 210 may facilitate this identification. In some embodiments, modules included in connection manager modules 210 may have access to a previously enumerated network topology and associated connection methods. In these embodiments, a most appropriate connection method may be identified by evaluating other methods for connecting to points in the network topology. In other embodiments, the connection manager modules 210 may search for connection methods at the time a request is received and evaluate connection methods enumerated from the search.

Requests manager 212 may manage a list of requests that have yet to be serviced and active connections manager 213 may manage a list of currently active requests. Requests manager 212 and active connection manager 213 may track resources that are currently in use and/or that have been requested by connection requests. Connection service provider manager 214 may manage the connection service provider modules 220. When a connection method is selected, connection service provider module 214 may cause one or more modules included in connection service provider modules 220 to establish connections. When connection manager modules 210 receive a request for access to a remote resource included in a destination network, connection planner 211 may initially process the request and then pass data to other modules for additional processing.

Connection planner 211 evaluates the available connection methods and selects a "most appropriate" connection method to service a request. This may include evaluating requests currently being managed by requests manager 212 and active connection manager 213. A most appropriate connection method may be defined by entities that control access to resources for a computing device, control access to the destination network, or other entities that have an interest in the connection methods used by a computing device. For example, wireless carriers may define logic for accessing resources included in networks under their control. Additionally, connection planner logic is extensible, so that different entities may configure different logic into their connection planners. As such, different connection planner modules may be programmed and utilized to select connections in different manners. Different connection planner modules may be interchanged without affecting operation of other modules included in FIG. 2.

Connection planner 211 may evaluate a variety of data when identifying a most appropriate connection method. Such data may include local resources that are currently available in a computing device, the priority of requests, connection parameters associated with connection methods, or other data that may or may not make a connection method appropriate for connecting to a remote resource. A user may override a connection planner's identification of a connection method by designating a fixed connection method for accessing a remote resource.

Figure 5A:
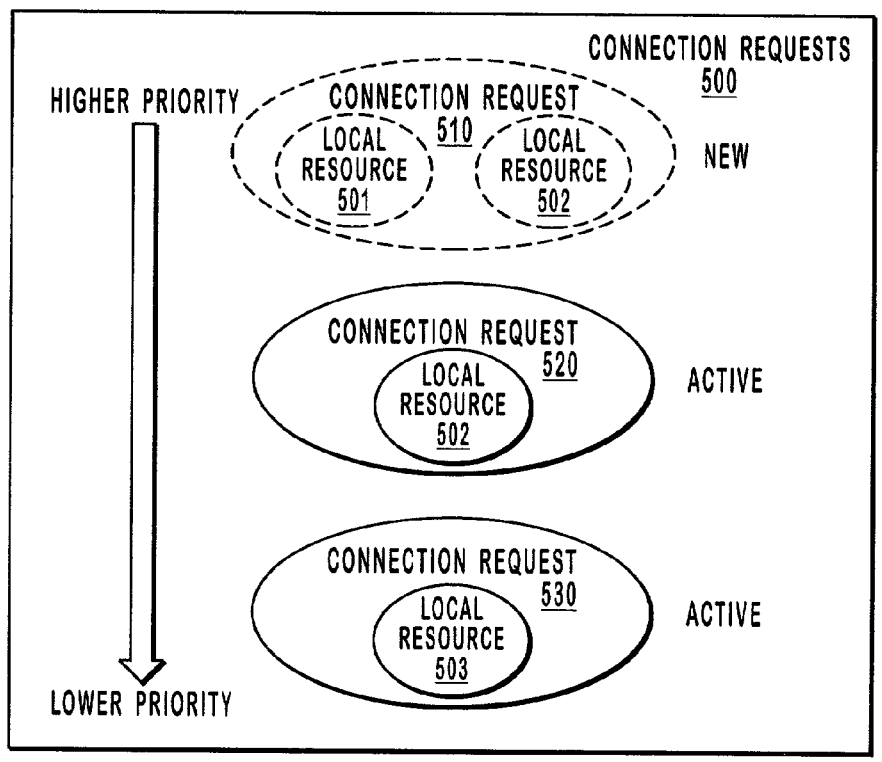
FIG. 5A illustrates an example of prioritized connection requests

Illustrated in FIG. 5A are connection requests 500 including new connection request 510 and active connection requests 520 and 530. Connection requests 510, 520, and 530 are prioritized, with connection 510 having the highest priority and connection 530 having the lowest priority. Priorities may be assigned to connection requests based on applications associated with the connection requests. For example, requests from sync engine 202 may be assigned a higher priority than requests from messaging application 206. Priorities may also be assigned to connection requests based on the current state of applications associated with the connection requests. For example, a request from an application that is currently active may be assigned a higher priority than a request from an application running in the background. Priorities may also be assigned to connection requests based on characteristics associated with the connection requests. For example, voice requests may be assigned a higher priority than data requests. It should be understood that these are only examples of assigned priorities. It would be apparent to one skilled in the art, after having reviewed this description, that priorities may be assigned to connection requests using a variety of methods.

Figure 4:
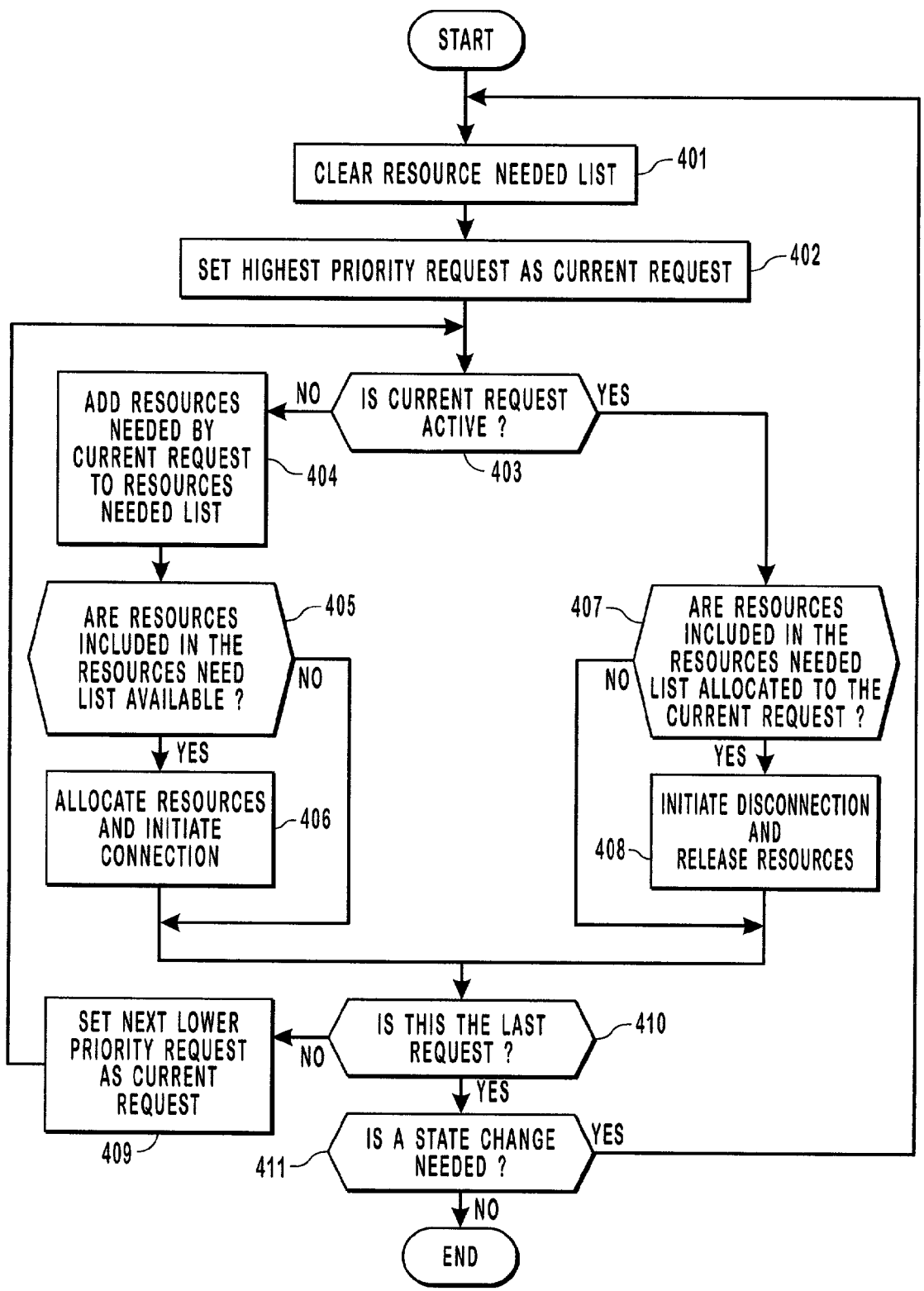
FIG. 4 is a flow diagram illustrating an example of decision logic utilized to allocate local resources to connection requests.
Figure 5B:
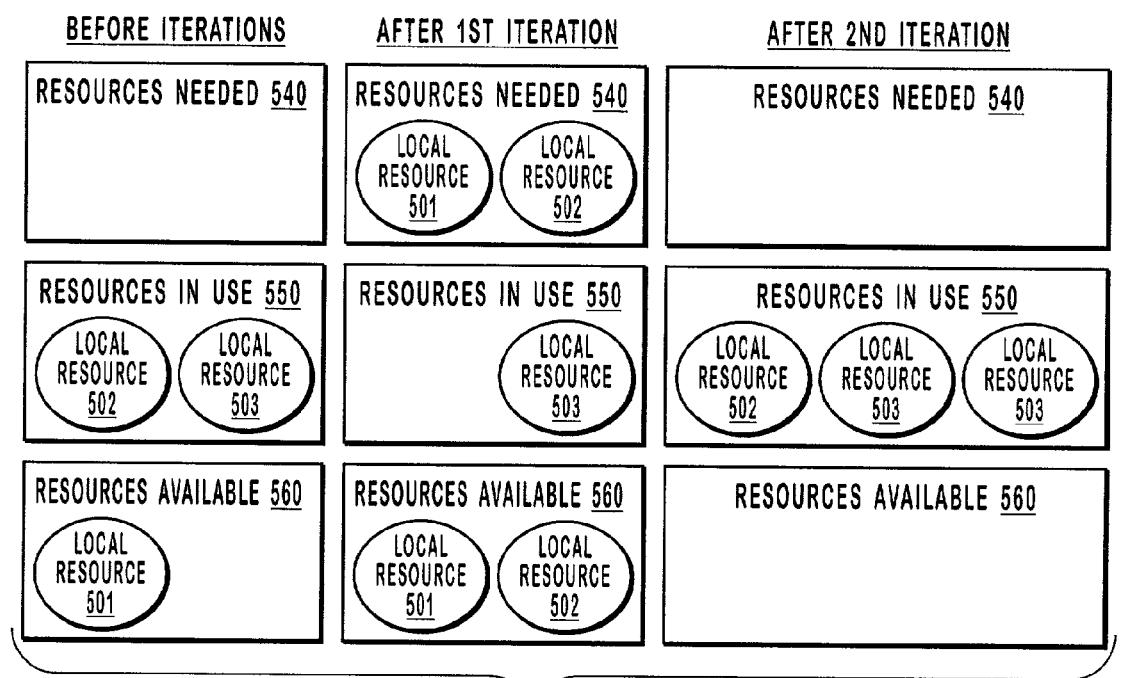
FIG. 5B illustrates an example of the allocation of local resources to connection requests.

Illustrated in FIG. 4 is a flow chart of the decision logic utilized to allocate accessible resources to connection requests. Connection planner 211 may execute the logic illustrated in FIG. 4 when identifying a most appropriate connection method. Illustrated in FIG. 5B are resources needed 540, resources in use 550, and resources available 560. These resources are illustrated before any iterations of the decision logic (left column), after a first iteration of the decision logic (middle column), and after a second iteration of the decision logic (right column). The decision logic illustrated in FIG. 4 will be described with reference to connection requests and resources included in FIGS. 5A and 5B.

It should be understood that the decision logic illustrated in FIG. 4 may be one of many different portions of decision logic used by connection planner 211 for identifying a most appropriate connection method in act 302. Connection planner 211 may combine the decision logic illustrated in FIG. 4 with other decision logic when identifying a most appropriate connection method as will be described further below. Since connection planner 211 is extensible, the importance of different portions of decision logic may be varied.

As illustrated in FIG. 5B under the heading "Before Iterations," no resources are needed, and local resource 502 and local resource 503 are in use, before any iterations of the decision logic illustrated in FIG. 4 are performed.

The decision logic illustrated in FIG. 4 may begin by clearing a resource needed list (act 401) and setting the highest priority request as the current request (act 402). Receiving a new connection request, such as connection request 5 10, may trigger execution of the decision logic. In FIG. 5A, connection request 510 is to use local resource 501 and local resource 502. Local resources may include hardware modules, such as a modem or network adapter, and software modules, such as communication software or protocol stacks. Since connection request 510 has the highest priority, it is set as the current request in act 402.

In decision block 403, it is determined whether of not the current connection request is active. Since the current request (in this case, connection request 510) is a new request and it has not yet been connected, the method proceeds to act 404 (NO in decision block 403). In act 404, the resources needed by the current request are added to the resources needed list. For connection request 510, local resource 501 and local resource 502 would be added to the resources needed list. After adding resources to the resources needed list, the decision logic determines if the needed resources are currently available (decision block 405). This may include checking the requested resources to see if they are currently in use by an active connection request or other module in a computing device.

Allocation of resources may be done as individual resources become available or only after all resources associated with a connection request become available. For purposes of describing the connection requests and resources in FIGS. 5A and 5B, it will be assumed that no resources are allocated to a connection request unless all the requested resources are available. Thus, connection request 510 will be allocated resources after local resource 501 and local resource 502 are both available.

If the requested resources are not available (NO in decision block 405), the decision logic determines if the current request is the last request. If the current request is not the last request (NO in decision block 410), the decision logic sets the next lower priority request as the current request in act 409. In FIG. 5A, the next lower priority request is connection request 520. The decision logic then determines if the next lower priority request is active in decision block 403. Since connection request 520 is currently connected (YES in decision block 403), it is determined in decision block 407 if the current connection request (at this stage, connection request 520) is utilizing resources included in the resources needed list. Local resource 502 was added to the resources needed list by connection request 510 and local resource 502 is currently being utilized by connection request 520 (YES in decision block 407). Thus, local resource 502 will be released in act 408. Since there are still more connection requests (NO in decision block 410), connection request 530 will then be set as the current connection request and the logic will be executed again.

When executing the decision logic for connection request 530 it will be determined that connection request 530 is active (YES in decision block 403) and is not utilizing resources included in the resources needed list (NO in decision block 407). Since this is the last request (YES in decision block 410), the decision logic will determine if a state change is needed in decision block 411. A state change may be needed, if after executing the decision logic for the lowest priority connection request, there are still resources included in the resources needed list. For example, connection request 510 added local resource 501 and local resource 502 to the resources needed list and these resources were not allocated to connection request 510 at the time the decision logic was processing connection request 510. If a state change is needed (YES in decision block 411), the decision logic will again be executed for a second iteration through the connection requests.

Shown in FIG. 5B is the status of resource allocation after the first iteration of the decision logic just described above. As shown after the first iteration, local resource 502 is now included in resources available 560.

In a second iteration through the decision logic, local resource 501 and local resource 502 will be allocated to connection request 510. After the connection request 510 is assigned as the current request in act 402, it will be determined that the current request is not active (NO in decision block 403). It will then be determined that the resources included in the resources needed list are available (YES in decision block 405). Thus, the resources needed for connection request 510 (i.e., local resource 501 and local resource 502) are allocated to the connection request 510 (act 406) and are thus added to the resources in use 550. Processing of connection request 520 and connection request 530 during the second interaction of the decision logic results in no change to any of the resources. After processing connection request 530 during the second iteration of the decision logic, it will be determined that a state change is not needed (NO in decision block 411) and execution of the decision logic will terminate. This results because all resources are allocated to the highest priority connection request that requested the resources. After the second iteration of the decision logic, local resource 501 and local resource 502 are allocated to connection request 510, no resources are allocated to connection request 520, and local resource 503 is allocated to connection request 530.

In other embodiments, decision logic similar to that included in FIG. 4 may be executed to facilitate connection of a plurality of connection requests utilizing a single connection method or a reduced number of connection methods. In a general-purpose computing device, such as telephonic device 100, there may be a plurality of new connection requests at a given time. For example, telephonic device 100 may request synchronization of an electronic mail account and access to a remote web page. Connection planner 211 may identify a single connection method as the most appropriate method, for example, the establishment of a dial-up connection to an Internet Service Provider ("ISP"), for both connection requests.

Connection planner 211 may also utilize decision logic similar to that included in FIG. 4 to select the most appropriate connection method or methods for a plurality of applications requesting access to remote resources on different destination networks. In a general-purpose computing device, assume that sync engine 202 and pocket web browser 207 are requesting access to resources included in a corporate Local Area Network ("LAN") and messaging application 206 is requesting access to resources included in the Internet. A variety of connection methods may be used to satisfy these three requests. One connection method would be to establish a dial-up connection to the Internet and then establish a Virtual Private Network ("VPN") connection to the corporate LAN. Once connected to the corporate LAN, a proxy server may be used to access resources included in the Internet. Another connection method would be to establish a dial-up connection to the corporate LAN and then use a proxy server to access resources included in the Internet. Depending on the decision logic included in connection planner 211 it may be configured to select either method or a completely different method to satisfy all three requests.

In other embodiments, an application may notify connection planer 211 it wishes to "piggy back" on other connection requests. That is, an application may request to only access resources in a destination network when another application is already accessing resources. For example, sync engine 202 may wish to synchronize an electronic mail account only when a connection to the Internet has been established for another application. Applications that wish to piggy back, may call APIs associated with connection manager modules 210 and be given an open handle. The open handle facilitates notification back to the application that a connection on which the application may want to piggy back has been established.

It may also be that there exists one or more applications that register with a connection planner, such as connection planner 211, to access remote resources on destination networks at predefined intervals. For example, an electronic mail application may register to synchronize an electronic mailbox every hour between 8:00 AM and 5:00 PM. If a plurality of applications register recurring connection requests, connection planner 211 may attempt to establish a minimum number of connections to satisfy the plurality of connection requests. Consider a first application that registers a connection request that recurs every hour and a second application that registers a connection request that recurs every two hours. Connection manager 211 will attempt to "line up" the time when connections are established, so that the first application and second application share a connection when the second application's connection request is serviced. Modules included in connection manager modules 210 may cause applications associated with a recurring request to be executed concurrently with a scheduled connection being established.

Figure 6:
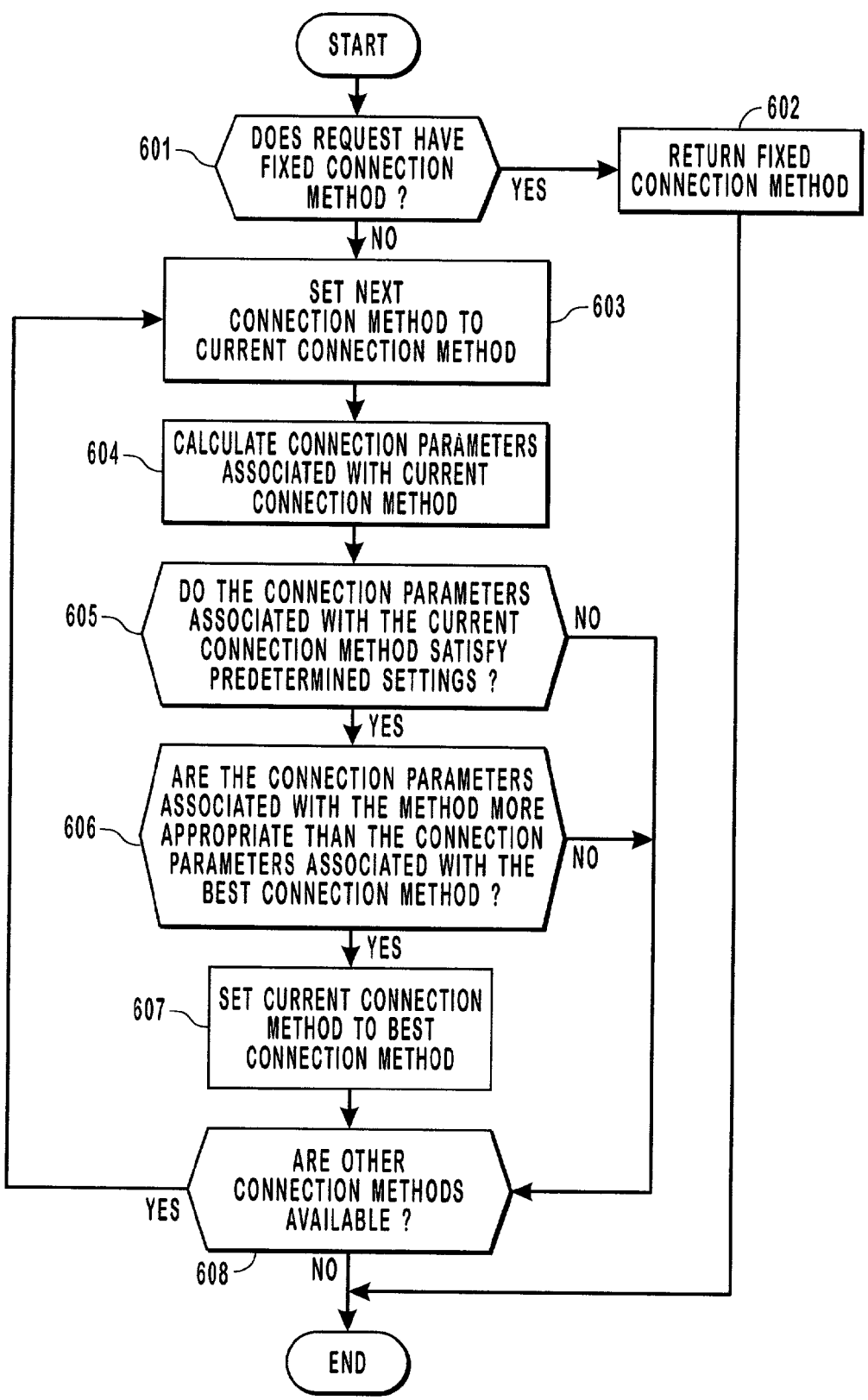
FIG. 6 is a flow diagram illustrating an example of decision logic utilized for selecting a connection method based on connection parameters.

In other embodiments, identifying a most appropriate connection in act 302 may include evaluating connection parameters associated with connection methods. Shown in FIG. 6, is a flow chart illustrating an example of the decision logic that may be used to identify a most appropriate connection method based on connection parameters associated with connection methods. Connection planner 211 may execute such decision logic, when a request for a connection to a destination network is received from one of the application modules 200.

The decision logic in FIG. 6 may determine if a connection request has a fixed connection method (decision block 601). This may result from a user override or the configuration of connection planner 211. If the connection request does not have a fixed connection method (NO in decision block 601), the decision logic sets the next connection method to the current connection method (act 603). If no connection methods have been evaluated, a first connection method may be selected. The decision logic in FIG. 6 then calculates connection parameters associated with the current connection method (act 604).

Connection parameters associated with a connection method may be any of a variety of parameters well known in the art. Decision logic in FIG. 6 may calculate the bandwidth of a connection method, the latency of a connection method, the cost of a connection method, the type of connection method, or other parameters that may be relevant to determining if a connection method is most appropriate for a connection request. For example, a connection method using a connection-oriented protocol, such as Transmission Control Protocol ("TCP") may be more appropriate than a connection using a connectionless protocol, such as User Datagram Protocol ("UDP"). One or more connection parameters may be combined or aggregated to generate a value representative of the appropriateness of a connection method.

Connection parameters may be calculated for each communication link utilized by a connection method. Often, when accessing a remote resource on a destination network, a series of communication links will be navigated to reach the destination network. Each of these communication links may include different connection parameters. For example, a first connection method may utilize a series of Integrated Services Digital Network ("ISDN") links, while a second connection method utilizes a dial-up link and a VPN connection. In such cases, the first connection method may be preferred over the second connection method because the bandwidth of the connection will be limited to the speed of the dial-up links.

In some embodiments, an overall representation of the transmission bandwidth for a connection method that includes a series of communication links may be calculated. This overall representation may account for individual communication links that vary in transmission bandwidth with respect to each other. Generating an overall representation may include calculations associated with each communication link. This may include calculations involving the maximum bandwidth of a communication link and a multiplier associated with the communication link. The maximum bandwidth associated with a first communication link may be compared to a current maximum bandwidth. The current maximum bandwidth may be assigned by a user or may be a maximum bandwidth associated with another communication link or links included in a connection method If the maximum bandwidth associated with the first communication link is less than the current maximum bandwidth, the current maximum bandwidth is replaced with the maximum bandwidth associated with the first communication link. For example, if the current maximum bandwidth is 128 kilobits per second and the first communication link has a maximum bandwidth of 56 kilobits per second, the current maximum bandwidth will be replaced by the 56 kilobits per second value.

If the maximum bandwidth associated with the first communication link is greater than the current maximum bandwidth, the current maximum bandwidth may be multiplied by the multiplier associated with the first communication link. This may result in a new current maximum bandwidth that is less than the current maximum bandwidth. For example, assume the current maximum bandwidth is one megabit per second and a first communication link has a maximum bandwidth of five megabits per second and is associated with a multiplier of 0.95. In this example, the resultant maximum bandwidth will be equal to one megabit per second multiplied by 0.95, or 950 kilobits per second. The multiplier may be configured by a user and may be utilized to factor in loss of bandwidth when communicating across different types of communications mediums.

Latencies and costs associated with a series of communication links may be added together to calculate an overall latency and overall cost associated with a connection method.

Another parameter that may be associated with connection methods is whether or not a connection method will utilize a VPN connection. Transmission bandwidth on a communication link utilizing a VPN connection may be significantly less than transmission bandwidth on the same communication link when not utilizing a VPN connection. In some cases, transmission bandwidth associated with a communication link utilizing a VPN connection may be approximately twenty percent of the transmission bandwidth associated with the communication link when not utilizing a VPN connection.

In some embodiments an application may request a secure connection. In such embodiments, a connection parameter that is determinative of whether or not a connection method is secure may be associated with a connection method.

Another parameter that may be associated with a connection method is the location of a computing device. For example, location services for locating mobile devices may utilize enhanced 911 data. Based on location data, it may be determined that dialing a local access number is more cost efficient that dialing a long distance access number. Fixed location data may also be configured into connection manager modules 210 to increase the chance of using less expensive and more efficient connection methods.

Connection parameters associated with a connection method may also include historical statistical data associated with the connection method. In embodiments where APIs associated with connection manager modules 210 and connection service provider modules 220 are integrated into a protocol stack, such statistical data may be included in the protocol stack. Such statistical data may include error rates associated with connection methods and actual transmission bandwidths associated with connection methods.

The decision logic in FIG. 6 may determine if parameters associated with the current connection method satisfy predetermined settings (decision block 605). For example, a connection method may not be appropriate if the latency associated with the connection method is above a predetermined threshold or if the bandwidth associated with the connection method is below a predetermined threshold. Combinations or aggregations of parameters may also be evaluated in making such a determination. For example, connection planner 211 may be configured only to compare the overall bandwidth associated with a connection method to predetermined settings or may be configured to compare associated bandwidths and associated costs. When connection parameters are aggregated, connection planner 211 may be configured to compare values that are representative of a plurality of associated connection parameters to predetermined settings.

If the current connection method satisfies predetermined settings (YES in decision block 605), the connection logic may determine if the current connection is more appropriate than the best connection method. Determining if the current connection method is more appropriate may include comparing connection parameters associated with the current connection method to connection parameters associated with the best connection method (decision block 606). These comparisons may be similar or different to the comparisons in decision block 605. A comparison may include comparing individual connection parameters and/or combinations of parameters and/or aggregate representations of connection parameters. For example, to satisfy predetermined settings a current connection method may only need to be associated with a certain amount of bandwidth. However, to determine if the current connection method is more appropriate than the best connection method, the current connection method may need to be more cost efficient than the best connection method, involving a comparison of both bandwidth and cost.

If the connection parameters associated with the current connection method are more appropriate than the best connection method (YES in decision block 606), the current connection method is set to the best connection method (act 607). If other unchecked connections methods are available (YES in decision block 608), the next connection method is set to the current connection method in act 603. The decision logic in FIG. 6 may be executed for each available connection method.

It should be understood that the decision logic illustrated in FIG. 4 and FIG. 6 are exemplary of a wide variety of types decision logic that may be in included in connection manager modules 210. It should also be understood that connection manager modules 210 may evaluate a most appropriate connection based on a plurality of different types of decision logic. For example, connection planner 211 may allocate a modem to a connection method only if the modem is currently available and may establish a connection above a certain bandwidth. Connection planner 211 may also combine and/or aggregate results for different types of decision logic to generate data representative of the appropriateness of a connection method.

In some embodiments, decision logic utilized by connection planner 211 may identify a cached connection as the most appropriate connection method. A cached connection may be a connection that was not disconnected after a previous connection request was satisfied. For example, when browsing a remote Web page a connection is only active during the download of the Web page. After the Web page is fully downloaded the connection is idle. It may be that certain groups of users often download a series of related pages over a period of time. In these cases a connection may be cached, or remain active, for a certain amount to time even though no remote resources are being accessed.

Caching may be used where connection methods take an excessive amount of time to establish when compared to the time needed to access a resource. For example, some dial-up connections may take up to thirty seconds to connect while downloading a Web page takes only a few seconds. Caching may also be used where establishing a new connection is costly when compared to maintaining an already active connection. The amount of time a connection is cached may be varied by configuring connection manager modules 210.

Returning to FIG. 3, a connection using the most appropriate connection method may be established (act 303). This may include connection service provider manager 214 causing connection service provider modules 220 to establish a connection to the destination network. For example, if the most appropriate connection method is determined to be through a proxy server, proxy 225 may cause a connection to be established to the proxy server. Connection service provider modules 220 may cause modules in system level APIs 230 to execute in order to facilitate the establishment of a connection. For example, when establishing a voice connection method, voice 221 may cause modules included in voice APIs 231 to be executed.

In some embodiments, connection manager modules 210 include the ability to perform source routing when establishing a connection. In these embodiments, a protocol stack may include multiple interfaces to system level APIs 230. Each interface to system level APIs may be associated with a separate connection method. This may lead to an associated computing device including multiple network addresses. When a most appropriate connection method is identified, connection service provider modules 220 may call system level APIs 230 with data that causes a protocol stack to be called in a particular way or causes packets to be routed through a particular gateway.

During operation, connection manager modules 210 may cause resources to be released from and allocated to connection methods. When this occurs, connection manager modules 210 may notify application modules 200 of such changes. For example, application modules may be notified that a connection will be established, that a connection is currently active, that connection is being disconnected, that no connection is currently active, that a connection to a resource is blocked for some reason, or any other notification associated with the connection to resources. Likewise, application modules 200 may query connection manager modules 200 for such changes. Connection manager modules 210 may also provide connection specific parameters to application modules 200 including, bandwidth, latency, power consumption, cost, physical location, past connection success, or other parameters previously discussed. Application modules 200 may query connection manager modules 210 for such parameters.

By automating the establishment and management of connections, the level of information a user must know about connections is significantly reduced. This is particularly advantageous for mobile computing devices that may have a large number of connection methods available. Since the establishment and management processes are automated, comparisons between connection methods to identify a most appropriate connection method are more easily realized.

Overall, embodiments of the present invention provide for establishing and maintaining connections in a manner that promotes cost efficiency and efficient utilization of available connection methods.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a computing device that is capable of establishing connections using a variety of different kinds of connection methods, a method of establishing a connection without necessarily requiring that the user specify the connection method to use, the method comprising the following:
   an act of receiving a request to access a remote resource that is included in a destination network, wherein the act of receiving the request comprises:
      receiving a request to access a remote resource that was sent from an application module; and
      an act of an API associated with a connection manager receiving a request to access a remote resource;
   an act of at least partially automatically, identifying a most appropriate connection method for connecting to the destination network, from among a plurality of connection methods for connecting to the destination network; and
   an act of causing a connection to be established to the destination network using the most appropriate connection method.

2. The method as recited in claim 1, wherein the act of causing a connection to be established to the destination network using the most appropriate connection method comprises the following:
   an act of an API associated with a connection service provider causing a connection to be established to the destination network using the most appropriate connection method.

3. In a computing device that is capable of establishing connections using a variety of different kinds of connection methods, a method of establishing a connection without necessarily requiring that the user specify the connection method to use, the method comprising the following:
   an act of receiving a request to access a remote source that is included in a destination network, wherein the act of receiving the request comprises receiving a request to access a remote resource that was sent from an application module;
   an act of at least partially automatically, identifying a most appropriate connection method for connecting to the destination network, from among a plurality of connection methods for connecting to the destination network, wherein the act of identifying a most appropriate connection method for connecting to the destination network comprises an act of calculating an aggregate value of connection parameters associated with each connection method included in the plurality of connection methods; and
   an act of causing a connection to be established to the destination network using the most appropriate connection method.

4. The method as recited in claim 3, wherein the act of identifying a most appropriate connection method for connecting to the destination network, from among a plurality of connection methods for connecting to the destination network comprises the following:
   an act of comparing aggregate values of connection parameters associated with each connection method included in the plurality of connection methods.

5. The method as recited in claim 3, wherein the act of identifying a most appropriate connection method for connecting to the destination network comprises the following:
   an act of identifying a connection method that was previously cached.

6. The method as recited in claim 3, wherein the act of identifying a most appropriate connection method for connecting to the destination network comprises the following:
   an act of identifying a connection method associated with a user override function.

7. The method as recited in claim 3, wherein the act of causing a connection to be established to the destination network using the most appropriate connection method comprises the following:
   an act of causing a connection to be established to the destination network using a connection method that is associated with a user override function.

8. In a computing device that is capable of establishing connections to destination networks by using a plurality of connection methods, each connection method consuming one or more local resources accessible by the computing device, a method of establishing one or more connections without necessarily requiring that the user specify the connection method to use, the method comprising the following:
   an act of receiving a new connection request to access one or more remote resources that are included in one or more destination networks;
   an act of comparing the new connection request to one or more active connection requests and to the local resources currently accessible by the computing device to determine a most appropriate connection method, wherein the act of comparing comprises:
      an act of comparing the plurality of connection methods to a resources available list; and
      an act of comparing a priority of the new connection request to the priorities of the one or more active connection requests to the local resources currently available in the computing device to determine a most appropriate connection method;
   an act of causing connection methods associated with active connection requests of lower priority than the new connection request to release resources; and
   an act of causing one or more connections to be established to the one or more destination networks using the most appropriate connection method.

9. The method as recited in claim 8, further comprising:
   an act of released resources being allocated to the most appropriate connection method.

10. In a computing device that is capable of establishing a connection to a destination network by using a plurality of connections methods, each connection method including one or more connection parameters associated with connecting to the destination network, a method of establishing a connection without necessarily requiring that the user specify the connection method to use, the method comprising the following:
   an act of receiving a request to access a remote resource that is included in the destination network;
   an act of comparing the one or more connection parameters associated with each connection method in the plurality of connection methods, to determine the most appropriate connection method for connecting to the destination network, wherein the act of comparing comprises comparing a parameter representative of the bandwidth associated with each connection method in the plurality of connection methods; and an act of causing a connection to be established to the destination network using the most appropriate connection method.

11. The method as recited in claim 10, wherein the act of comparing a parameter representative of the bandwidth associated with each connection method in the plurality of connection methods comprises the following:

an act of comparing a bandwidth parameter for each connection method that was calculated using the bandwidth associated with individual communication links included in each connection method.

12. The method as recited in claim 11, wherein the act of comparing a bandwidth parameter for each connection method that was calculated using the bandwidth associated with individual communication links included in each connection method comprises the following:

an act of comparing a bandwidth parameter for each connection method that was calculating by multiplying a bandwidth value associated with one of the individual communication links by a connection method specific multiplier.

13. The method as recited in claim 10, wherein the act of comparing the one or more connection parameters associated with each connection method of the plurality of connection methods comprises the following:

an act of comparing a parameter representative of the latency associated with each connection method in the plurality of connection methods.

14. The method as recited in claim 13, wherein the act of comparing a parameter representative of the latency associated with each connection method in the plurality of connection methods comprises the following:

an act of comparing a parameter representative of latency that, for each connection method, was calculated by adding the latency associated with each communication link in the connection method.

15. The method as recited in claim 10, wherein the act of comparing the one or more connection parameters associated with each connection method of the plurality of connection methods comprises the following:

an act of comparing a parameter representative of the monetary cost associated with each connection method in the plurality of connection methods.

16. The method as recited in claim 15, wherein the act of comparing a parameter representative of the monetary cost associated with each connection method in the plurality of connection methods comprises the following:

an act of comparing a parameter representative of monetary cost that, for each connection method, was calculated by adding the monetary cost associated with each communication link in the connection method.

* * * * *